(No Model.)

C. WEHNER.
CLUTCH.

No. 388,233. Patented Aug. 21, 1888.

Witnesses:
Theo. L. Popp
Geo. J. Buchheit, Jr.

Christian Wehner, Inventor.
By Wilhelm Bonner.
Attorneys.

UNITED STATES PATENT OFFICE.

CHRISTIAN WEHNER, OF BUFFALO, NEW YORK.

CLUTCH.

SPECIFICATION forming part of Letters Patent No. 388,233, dated August 21, 1888

Application filed April 30, 1888. Serial No. 272,333. (No model.)

*To all whom it may concern:*

Be it known that I, CHRISTIAN WEHNER, of the city of Buffalo, in the county of Erie and State of New York, have invented a new and useful Improvement in Clutches, of which the following is a specification.

This invention relates to that class of clutch mechanisms which are employed for converting reciprocating or oscillating motion into rotary motion, and more particularly to an improvement on the clutch described and shown in Letters Patent No. 360,262, granted to me March 29, 1887.

It is found in practice that when the clutch is abundantly lubricated the friction-rollers arranged between the cam-shaped ribs of the hub and the ring surrounding the hub are liable to slip and impair the operation of the clutch.

The object of my invention is to construct these friction-rollers and their bearing-surfaces in such a manner as to effectually prevent slipping of the rollers; and the invention consists of the improvements which will be hereinafter set forth, and pointed out in the claims.

Figure 1:
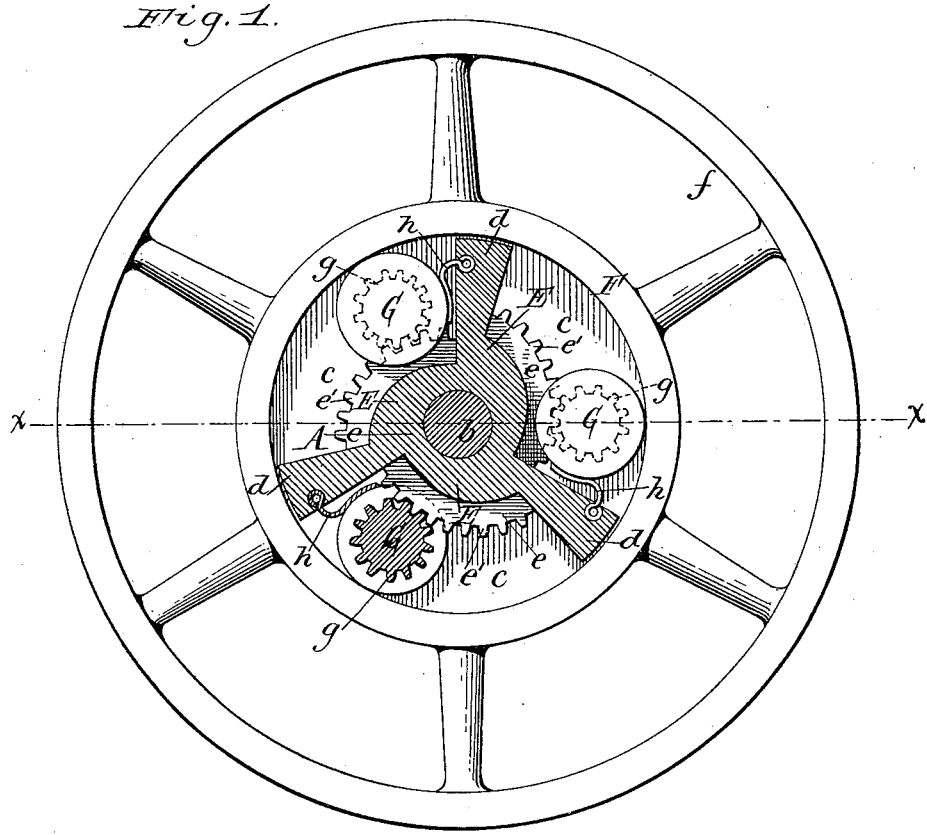
Figure 2:
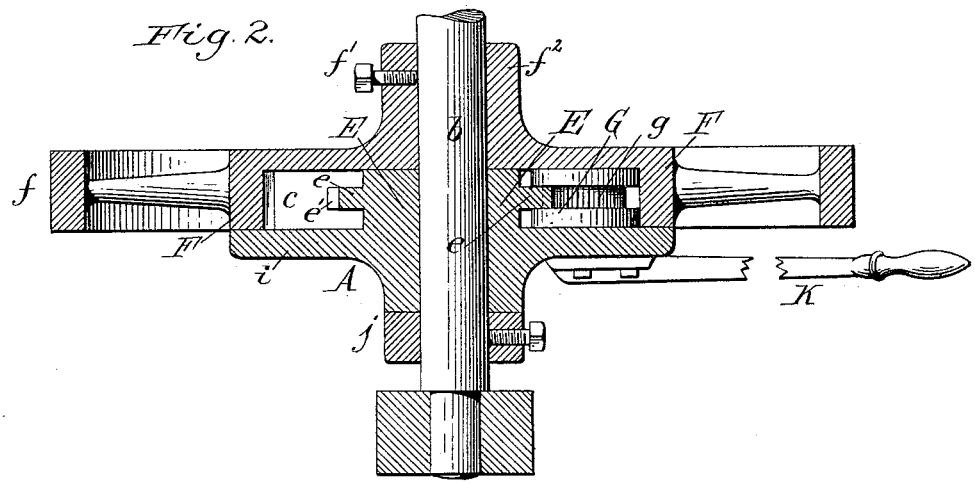

In the accompanying drawings, Figure 1 is a sectional side elevation of my improved clutch. Fig. 2 is a cross-section thereof in line $x$ $x$, Fig. 1.

Like letters of reference refer to like parts in both figures.

A represents the hub, which turns loosely on a shaft or arbor, $b$. The hub A is provided with recesses $c$, which are formed in the face of the hub at equal distances apart, and are separated by the intervening projecting portions $d$. The hub A is provided in its recesses with cams or eccentric portions E, each of which is provided on its face with a central rib or feather, $e$, extending lengthwise over each cam.

$e'$ represents gear-teeth formed in the faces of the cam-ribs $e$ and extending from end to end thereof.

F represents the ring which surrounds the hub A, and which is provided with a wheel or pulley, $f$. The ring F is secured to the shaft $b$ by means of a set-screw, $f'$, which passes through a collar, $f^2$, formed on the outer side of the ring F.

G represents the friction-rollers arranged in the recesses $c$ of the hub between the ribs $e$ and the ring F. The central portion of each friction-roller is contracted or grooved and provided with gear-teeth $g$, which mesh with the teeth $e'$ of the cam-ribs $e$. The face portions of the friction-rollers G bear against the surrounding ring F, and only their contracted toothed portions $g$ bear against the toothed ribs $e$. The teeth of the ribs $e$ and friction-rollers G prevent the rollers from slipping on the ribs $e$ and compel the same to take a firm hold on the inner surface of the ring F.

$h$ represents flat springs secured to the projecting portions $d$ of the hub and bearing against the adjacent faces of the friction-rollers G, so as to force the same forwardly toward the contracted end of the recesses $c$ in contact with the toothed ribs $e$ and ring F and prevent lost motion in starting the clutch. The outer portions of these springs are concave and curved concentric with the faces of the friction-rollers so as to fit snugly against the same.

The hub A is provided with an annular flange, $i$, which bears against the adjacent side of the ring F and confines the friction-rollers in the ring, the hub being held in place by a collar, $j$, secured to the arbor $b$ on the outer side of the hub. The hub A is preferably provided with an actuating-lever, K, as shown in Fig. 2.

My improved clutch mechanism may be employed for operating the driving-wheels of velocipedes, the blowers of forges, foot and hand powers, and for various other purposes in which reciprocating or oscillating motion is to be converted into rotary motion.

I claim as my invention—

1. The combination, with the hub A, provided with cam-shaped ribs $e$, having teeth $e'$, of a ring, F, surrounding the hub, and friction-rollers G, arranged between the hub and ring and provided with teeth $g$, meshing with the teeth of said cam-ribs, substantially as set forth.

2. The combination, with the hub A, provided on its face with recesses $c$, separated by projections $d$, and cam-shaped ribs $e$, formed on the hub in the recesses $c$, and having gear-teeth $e'$, of a ring, F, surrounding the hub, and friction-rollers G, arranged in the recesses e, and provided with a contracted portion having gear-teeth g, which engage with the teeth of the cam-ribs e, substantially as set forth.

3. The combination, with the hub A, provided with cam-shaped ribs e, having gear-teeth e', of a ring, F, surrounding the hub, friction-rollers G, arranged between the hub and ring and provided with gear-teeth g, and springs h, secured to the hub and bearing against the friction-rollers, substantially as set forth.

Witness my hand this 25th day of April, 1888.

CHRISTIAN WEHNER.

Witnesses:
CARL F. GEYER,
FRED. C. GEYER.